Patented July 21, 1931

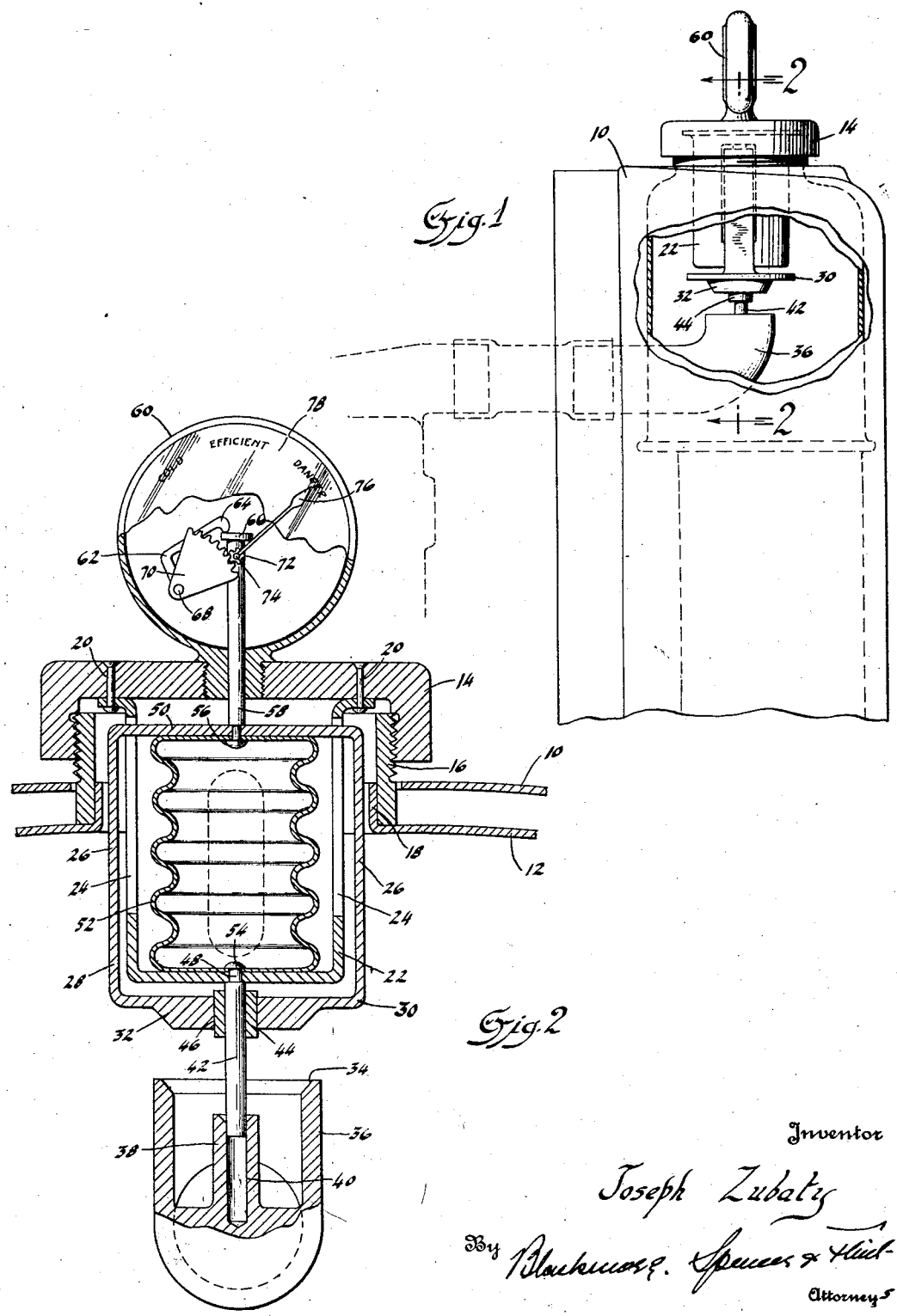

1,815,642

UNITED STATES PATENT OFFICE

JOSEPH ZUBATY, OF FLINT, MICHIGAN, ASSIGNOR TO A C SPARK PLUG COMPANY, OF FLINT, MICHIGAN, A COMPANY OF MICHIGAN

HEAT INDICATOR

Application filed July 1, 1927. Serial No. 202,867.

This invention relates to heat indicators for radiators used on automotive vehicles.

The heat indicators used in prior constructions have been in the form of thermometers or of a surface using a heat sensitive paint and are usually applied to the radiator cap. These indicators have depended on the direct reading on an expansible or color change heat sensitive member to show the change in thermal condition in the water cooling system, due to the increase in heat developed. It is the object of the present invention to confine this heat sensitive member entirely within the radiator and communicate the change in thermal condition to the outside by a direct mechanical connection.

The object of the invention is accomplished by attaching to the under side of the radiator cap a cup-shaped member to the bottom of which there is fixed a thermostat in the form of a bellows and to the top of which there is applied a yoke member passing through slots in the cup. To the upper portion of the yoke there is secured a rod forming a positive connection for transmitting the motion due to the expansion of the thermostat directly to the heat indicator. The yoke member loops about the lower portion of the cup and its bottom is formed in the shape of a valve which has a central opening through which passes a rod fixed to the lower portion of the cup and which slides in a boss formed in the engine outlet pipe of the cooling system. The outlet is formed into a valve seat conforming to the valve on the yoke and when the thermostat expands the valve is unseated. The boss serves as a guide for the heat indicator unit and assists in maintaining it in a positon such that the valve at the bottom of the yoke may properly rest on the valve seat of the outlet pipe.

The structure of the heat indicator is so arranged that it is entirely attached to the radiator cap and may be removed therewith as a unit.

The invention is disclosed on the accompanying drawings in which:

Figure 1 shows a side view of a portion of the radiator of an automotive vehicle with parts broken away for purposes of clearer illustration.

Figure 2 is a longitudinal section on the line 2—2 of Figure 1.

Referring to the numbered parts on the drawings, 10 indicates the usual automobile radiator having an upper tank 12 and a radiator cap 14, secured to a threaded collar 16, fixed to a flange 18 on the tank.

Secured to the radiator cap by means of the bolts 20 is a cup 22, having slots 24 in its sides for the reception of the arms 26 of the yoke-shaped member 28, the bottom portion of which is circular as shown at 30 in Figure 1 and is formed into a valve 32 adapted to rest on the seat 34 formed in the mouth of the engine outlet tube 36. The outlet tube 36 is provided with a boss 38 having a bore 40 for the reception of a guide rod 42, which passes through a bushing 44, within an opening 46 of the valve 32 and secured at 48 to the bottom of the cup 22.

The function of the boss 38 and the rod 42 is to properly position the heat indicating unit within the upper tank of the radiator and to form a guide and positive means for properly seating the valve 32 on the seat 34.

Positioned between the upper arm 50 of the yoke 28 and the bottom of the cup 22 is a thermostat 52. The thermostat is secured centrally of its lower end to the bottom of the cup by means of the peened over portion 54 of the stem 42 and to the arm 50 centrally of its upper end by means of a peened over portion 56 of the rod 58 which operates the mechanism of the heat indicating device.

The heat indicator or gauge is indicated as a whole at 60 and the operating mechanism thereof comprises a bent arm 62, the upper end 64 of which rests against a head 66 on the upper end of the rod 58. The arm 62 is fixed to a shaft 68 which has secured thereto a gear segment 70 which meshes with a pinion 72 rigid with a shaft 74 having fixed thereto a pointer 76 which swings over the scale 78 on the indicator 60.

The thermostat shown in Figure 2 may be filled with any suitable heat sensitive liquid such as ether or a mixture of alcohol and carbon tetrachloride.

The position of the parts in Figure 2 shows the maximum expansion of the thermostat and indicates the danger point on the scale 78. It will be noted that the valve 32 is off the seat 34 due to the expansion of the tube and permits the free circulation of water through the cooling system. When the thermostat is contracted so as to indicate the cold position on the scale 78 of the indicator, the valve 32 will rest on the seat 34 and prevent the flow of water through the circulating system. As the engine starts running and the water begins to heat up, the heat will be transmitted to the thermostat which will expand and lift the valve 32 from its seat, and cause the rod 58 to swing the end 64 of the arm 62 in an upward direction which will give a corresponding movement to the segment 70. The motion of the segment 70 will be transmitted to the small pinion or gear 72 which in turn will swing the pointer over the scale.

In order to remove the heat indicator as a unit it is merely necessary to unscrew the cap 14 from the threaded collar 16 and lift it out of the radiator.

I claim:

1. In combination with an automotive vehicle, a means for indicating temperature changes comprising a heat responsive element positioned at the inlet to the radiator, a member fixed to the radiator cap and to which the said element is secured, means movable with said element in response to temperature changes, a device on said means to control the opening of said inlet and operable by said element, and means outside said radiator operable from said element for indicating temperature changes.

2. In combination with an automotive vehicle, a means for indicating temperature changes comprising a heat responsive element secured to a member attached to the radiator, a second member attached to said element and movable therewith, a valve on said element for controlling the inlet to the radiator, an indicating device outside said radiator, and an operating rod extending through the radiator cap and connected to said element and indicating device.

3. In combination with an automotive vehicle, a means for indicating temperature changes comprising a heat responsive element positioned above the radiator inlet, a boss in said inlet, a member fixed to said radiator and to said element, a rod on said member extending into said boss, a yoke attached to and movable with said element, and means outside said radiator and operatively attached to said element for indicating temperature changes.

4. In combination with an automotive vehicle, a heat indicating device positioned at the radiator inlet, a member attached to the radiator cap and having a support in the inlet, a heat sensitive element supported by said member, a yoke operatively connected to said element and passing through slots in said member, a valve on said yoke for controlling the opening of said inlet, and means operatively connected to said yoke for indicating temperature differences.

5. In combination with an engine having a water cooling system and a radiator, a cap for the radiator, a thermostat operatively secured at one end to the radiator cap, a valve operatively connected to the opposite end of said thermostat, said valve controlling the water flow through said system, and temperature indicating means operated by said thermostat.

6. In combination with an engine having a radiator, a cap for said radiator, a thermostat secured to the cap, a yoke secured to and operable with the thermostat, a valve on said yoke for controlling the radiator water flow, and a temperature indicator on said cap operated by said thermostat.

7. In combination with an engine having a radiator, a cap for said radiator, a cup secured to said cap, a thermostat rigidly secured at one of its ends to said cup, a yoke secured to said thermostat and operating in slots in said cup, said yoke moving with said thermostat, a valve on said yoke to control the radiator water flow, and temperature indicating means on said cap operated by said thermostat.

8. In combination with an automotive vehicle having a radiator, a heat indicating device positioned at the radiator cap, a cup secured to the cap, a heat sensitive element secured in the cup, a yoke extending into the cup and secured to said element to be moved thereby, and means secured to said yoke to control the flow of water through the radiator.

9. In combination with an automotive vehicle having a radiator, a heat indicating device positioned at the radiator cap, a slotted cup secured to the cap, a heat sensitive element secured in the cup, a yoke extending through the slotted portion of the cup and secured to said element to be moved thereby, and a valve on said yoke to control the flow of water through the radiator.

10. In combination with an automotive vehicle having a radiator, a heat indicating device positioned at the radiator cap, a cup secured to the cap, a heat sensieive element secured in the cup, a yoke extending into the cup and secured to said element to be moved thereby, means secured to said yoke to control the flow of water through the radiator, and means secured to said cup to guide said control means.

11. In combination with an automotive vehicle having a radiator, a heat indicating device positioned at the radiator cap, a slotted cup secured to the cap, a heat sensitive element secured in the cup, a yoke extending through the slotted portion of the cup and secured to said element to be moved thereby, a valve on said yoke to control the flow of water through the radiator, and a rod secured to said cup to guide said valve.

12. In combination with an internal combustion engine having a circulating water cooling system, an expandible and contractible thermostat secured in the water system in direct contact with the water therein and actuated by changes in temperature of the water, and water temperature indicating means exterior to said system and water flow control means in said system directly operated by said thermostat.

13. In combination with an internal combustion engine having a circulating water cooling system and a radiator through which the cooling water passes, an expandible and contractible thermostat secured in the radiator and in direct contact with the water of the circulating system, and water temperature indicating means exterior to said system and water flow control means in said system operated by said thermostat, said last named means controlling directly the flow of water through the radiator.

14. In combination with an internal combustion engine having a circulating water cooling system and a radiator through which the cooling water passes, a radiator cap closing a water filling opening of the radiator, an expandible and contractible thermostat secured to the radiator cap and in direct contact with the water of the circulating system, and temperature indicating means exterior to the system and water flow control means inside the system operated by said thermostat, said last named means directly controlling the flow of water through the radiator.

15. In combination with an internal combustion engine having a circulating water cooling system and a radiator through which the water passes, an expandible and contractible thermostat secured in said radiator, a member attached to said thermostat and movable therewith, a valve mounted on said member and directly in the path of flow of the water for controlling the water flow through the radiator, and a water temperature indicating device outside said radiator operated by said thermostat.

In testimony whereof I affix my signature.

JOSEPH ZUBATY.